(12) United States Patent
Tan

(10) Patent No.: US 7,386,560 B2
(45) Date of Patent: Jun. 10, 2008

(54) METHOD AND SYSTEM FOR USER-CONFIGURABLE CLUSTERING OF INFORMATION

(75) Inventor: Ah Hwee Tan, Singapore (SG)

(73) Assignee: Kent Ridge Digital Labs, Singapore (SG)

(*) Notice: Subject to any disclaimer, the term of this patent is extended or adjusted under 35 U.S.C. 154(b) by 0 days.

(21) Appl. No.: 09/875,271

(22) Filed: Jun. 7, 2001

(65) Prior Publication Data

US 2002/0019826 A1 Feb. 14, 2002

(51) Int. Cl.
*G06F 7/00* (2006.01)
*G06F 17/30* (2006.01)

(52) U.S. Cl. ......................... 707/102; 707/6

(58) Field of Classification Search ............... 707/102, 707/100, 7, 6
See application file for complete search history.

(56) References Cited

U.S. PATENT DOCUMENTS

| | | | | |
|---|---|---|---|---|
| 5,371,807 A | * | 12/1994 | Register et al. | 382/159 |
| 5,671,333 A | | 9/1997 | Catlett et al. | |
| 5,675,710 A | | 10/1997 | Lewis | |
| 5,717,814 A | * | 2/1998 | Abecassis | 386/46 |
| 5,754,938 A | * | 5/1998 | Herz et al. | 725/116 |
| 5,787,420 A | | 7/1998 | Tukey et al. | |
| 5,848,396 A | * | 12/1998 | Gerace | 705/10 |
| 5,857,179 A | | 1/1999 | Vaithyanathan et al. | |
| 5,911,140 A | | 6/1999 | Tukey et al. | |
| 6,026,397 A | * | 2/2000 | Sheppard | 707/5 |
| 6,029,195 A | * | 2/2000 | Herz | 725/116 |
| 6,078,913 A | * | 6/2000 | Aoki et al. | 707/2 |
| 6,272,250 B1 | * | 8/2001 | Sun et al. | 382/225 |
| 6,393,427 B1 | * | 5/2002 | Vu et al. | 707/101 |
| 6,421,467 B1 | * | 7/2002 | Mitra | 382/240 |
| 6,515,681 B1 | * | 2/2003 | Knight | 345/751 |
| 6,578,025 B1 | * | 6/2003 | Pollack et al. | 707/2 |
| 2005/0021499 A1 | * | 1/2005 | Bradley et al. | 707/1 |

* cited by examiner

*Primary Examiner*—Etienne Leroux
*Assistant Examiner*—Cindy Nguyen
(74) *Attorney, Agent, or Firm*—Morrison & Foerster LLP

(57) ABSTRACT

A method and system for incorporating a user's preferences in an information clustering system having an information clustering engine for clustering information based on similarities, a user interface module for displaying the information groupings and obtaining user preferences, a personalization module for defining, labeling, modifying, storing and retrieving cluster structure, and a knowledge base where the user-defined cluster structure is stored. The user-configurable clustering system first organizes information into a list of automatic generated groupings or clusters. The list of groupings can then be modified by a user through an interactive process of personalization and re-clustering using a set of cluster manipulation operators. The personalized cluster indicates the user preference in organizing information and can be used to organize new information. The system can also be used to identify novel information that does not fit into the personalized cluster structure.

39 Claims, 6 Drawing Sheets

METHOD AND SYSTEM FOR USER-CONFIGURABLE CLUSTERING OF INFORMATION

FIELD OF THE INVENTION

This invention relates to the field of pattern processing and information management and more specifically to methods and systems for incorporating user interests and preferences in automated information clustering. Related fields of invention include information database content management, self-organizing information databases, document clustering, and personalized systems.

BACKGROUND OF THE INVENTION

Categorization and clustering have been two fundamental approaches to information organization and information database content management.

Categorization or classification is supervised in nature. A user defines a fixed number of classes or categories. The task is to assign a pattern or object to one or more of the classes. Categorization provides good control in the sense that it organizes the information according to the structure defined by the user. However, due to the predefined structure, categorization is not well suited to handling novel data. In addition, much effort is needed to build a categorization system. It is necessary to specify classification knowledge in terms of classification rules or keywords (disclosed in U.S. Pat. No. 5,371,807) or to construct a categorization system through some supervised learning algorithms (disclosed in U.S. Pat. Nos. 5,671,333 and 5,675,710). The former requires knowledge specification (e.g., written classification rules) and the latter requires example annotations (i.e. labeling information). Both are labor intensive.

Clustering is unsupervised in nature. For unsupervised systems (U.S. Pat. Nos. 5,857,179 and 5,787,420), there is no need to train or construct a classifier since information is organized automatically into groups based on similarities. However, a user has very little control over how the information is grouped together. Although it is possible to fine tune the parameters of the similarity measures to control the degree of coarseness, the effect of changing a parameter cannot be predicted; changing one parameter could affect all clustered results. In addition, the structure established through the clustering process is unpredictable. Whereas clustering is acceptable for a pool of relatively static information, in situations where new information is received every day, information with similar content may be grouped (based on different themes) into different clusters on different days. This ever-changing cluster structure is highly undesirable for the user who is navigating the information database to find desired information. Imagine the frustration of reading a newspaper with a different layout every day! U.S. Pat. No. 5,911,140 attempts to provide a solution by ordering document clusters based on user interests. However, the cluster ranking relies on the availability of the ranking of each document in the clusters and only very minimal user preferences are taken into account.

SUMMARY OF THE INVENTION

In order to overcome the various shortcomings of systems which effect only categorization or clustering of information with little or no account taken of user preferences, this invention provides a method and system that incorporate users' preferences in an information clustering system. In general, this system allows a user to create a cluster structure and influence or personalize the cluster structure by indicating his or her own preferences as to how information should be grouped. This invention further allows the user to store the cluster structure and subsequently retrieve it for future use.

The user-configurable information clustering system comprises an information clustering engine for clustering of information based on similarities, a user interface module for displaying the information groupings and obtaining user preferences, a personalization module for defining, labeling, modifying, storing and retrieving cluster structure, and a knowledge base where a user-defined cluster structure is stored.

According to the invention, each unit of information is represented by an information vector. A user preference, indicating a preferred grouping for the corresponding unit of information, can be represented by a preference vector. In addition, information, which may be in the form of a database, is supplied to the user configurable information clustering system by any well known means within the art.

In the preferred embodiment, the information clustering engine is a hybrid neural network comprising two input fields $F_1^a$ and $F_1^b$ with an $F_2$ cluster field. The $F_1^a$ field serves as the input field for the information vector A. The $F_1^b$ field serves as the input field for the preference vector B. The $F_2$ field contains a plurality of cluster nodes, each encoding a template information vector $w_j^a$ and a template preference vector $w_j^b$. Given an information vector A with an associated preference vector B, the system first searches for an $F_2$ cluster J encoding a template information vector $w_j^a$ that is closest to the information vector A according to a similarity function. It then checks if the associated $F_2$ template preference vector $w_j^b$ of the selected category matches with the input preference vector. If so, the templates of the $F_2$ cluster J are modified to encode the input information and preference vectors. Otherwise, the cluster is reset and the system repeats the process until a match is found.

Through the user interface and the personalization module, the user is able to influence the cluster structure by indicating his own preferences in the form of preference vectors. The user can create a new cluster, label an existing cluster, and/or modify cluster structure by merging and splitting clusters. In addition, the resulting customized cluster structure can be stored in the cluster structure knowledge base and retrieved at a later stage for processing new information.

In one embodiment of the invention, a system and method are provided for customizing the organization of an existing set of information according to the user's knowledge and preferences. In another embodiment, a system and method are provided for creating a cluster structure automatically and subsequently modifying this machine-generated cluster structure according to the user's preferences. In yet another embodiment, a system and method are provided for detecting new information and analyzing trends wherein the user, through repeated personalization of the cluster structure, identifies new information and trends previously unknown to him or her.

The disclosed invention is more flexible than a pure categorization system in which information must be assigned to one or more pre-defined categories or groups. At the same time, it is more flexible than a pure clustering or self-organizing system in which information is grouped according to similarities but the user has very little control over how the information is organized.

The invention has a number of advantages over the prior art: The invention performs clustering or self-organization of information based on similarities in content, i.e. similarities in information vectors. The information can be automatically organized without user training or prior construction of a classifier. The invention allows the user to correct or change the organization of the information as necessary. The invention also allows the user to intervene in the organization of the information both globally and locally. Further, the invention allows the user to control the coarseness of the information groupings without tuning the parameters of complex similarity functions. The invention also allows the user to indicate directly how specific units of information are to be organized.

BRIEF DESCRIPTION OF THE DRAWINGS

Embodiments of the invention will now be described by way of example with reference to the accompanying drawings in which.

DETAILED DESCRIPTION OF THE INVENTION

Figure 1:
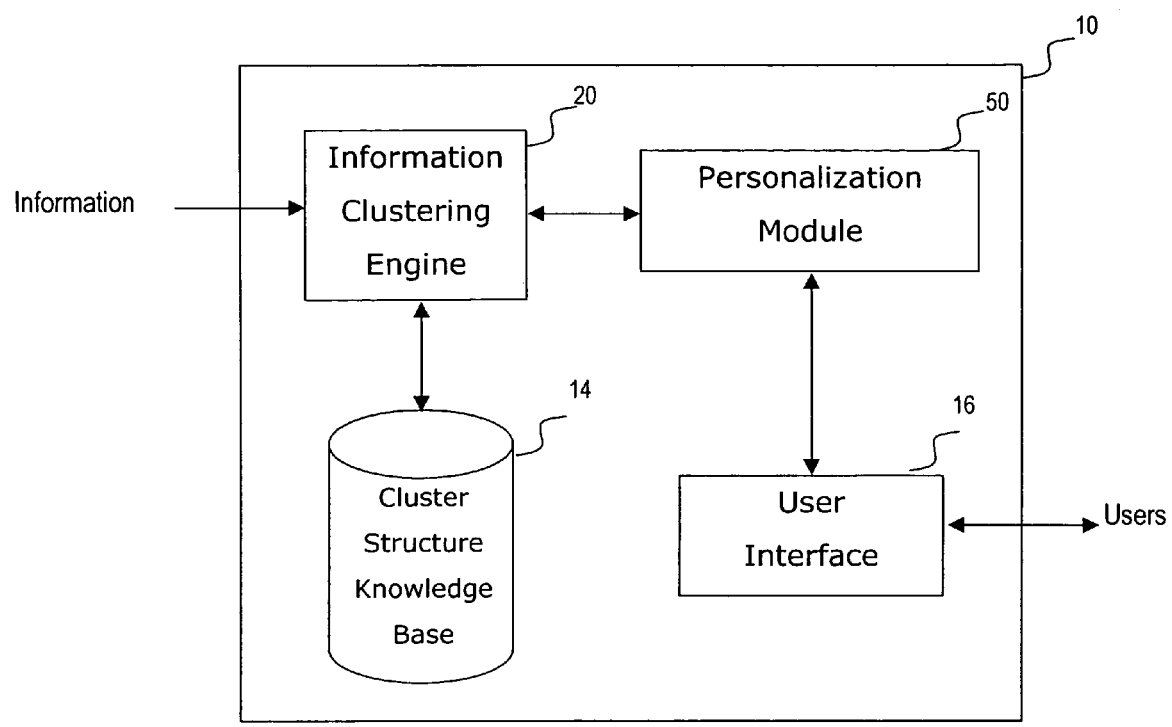
FIG. 1 illustrates an embodiment of a user-configurable information clustering system according to the present invention.

The invention is concerned with the organization of information, based on similarities in content, i.e. similarities in information vectors, according to a user's knowledge and preferences. The information comprises text, image, audio, video, or any combinations thereof. According to the invention, each unit of information ($\Phi$), defined as an individual element of information, may be any object, for example a document, person, company, country, etc., and can be represented by a complement coded 2M-dimensional information vector A of attributes or features, $$A=(a,a^c)=(a_1, \ldots, a_M, a_1^c, \ldots, a_M^c) \qquad (1)$$

where $a_i$ is a real-valued number between zero and one, indicating the degree of presence of attribute i, and $a_i^c=1-a_i$. Complement coding represents both the on-response and the off-response to an input vector and preserves amplitude information upon normalization.

In the case of documents, for example, the features in the information vectors could be token words commonly known as keywords. For example, in the exemplary case where the information is a business document, keywords may include "share", "market", "stock", "acquisition", "trading" etc. The feature sets can be predefined manually or generated automatically from the information set.

User preferences are represented by preference vectors that indicate the preferred groupings of the information. A preference vector B is a complement coded 2N-dimensional vector defined as $$B=(b, b^c)=(b_1, \ldots, b_N, b_1^c, \ldots, b_N^c) \qquad (2)$$

where $b_k$ is either zero or one, indicating the presence or absence of a user-defined class label $L_k$, and $b_k^c=1-b_k$. A user's knowledge comprises that information acquired by one in the user's profession, community, or field of endeavor or study. Also, this knowledge may include highly specialized information developed, acquired or used based on a user's unique experiences. An example of user knowledge includes a physician's knowledge of diseases, symptoms for those diseases, and appropriate treatments, including appropriate drugs; knowledge of this type from many practitioners could be placed in a database which could increase in content as new diseases were discovered, treated and cured. Using the invention, a physician could configure the database and additions thereto over time according to her own experience and specialty. Another example of user knowledge is a market analyst's understanding of trends in a given manufacturing sector over a given period of time; a database of wire news reports over a given period or updated on a periodic basis may contain information of use to the market analyst. Using the invention, the market analyst could configure such a database and updates thereto according to the particular sector of interest to him. Yet another example of user knowledge is a chef's knowledge of the cooking arts; a database of culinary dishes, ingredients, foods, etc., which may be intermittently modified, contains information of use to the culinary field. Using the invention, the chef can, for example, create groupings of ingredients for culinary dishes of interest to her. Another example of user knowledge is the preferred grouping of news articles by a journalist. A journalist, depending on his target readers, may organize articles from local and foreign sources into specific groupings that would be most appropriate for his purposes. For example, a Singapore journalist might organize foreign news into threads that are of interest to Singaporeans, such as "Michael Fay Event", "Singapore Economics" etc. Other examples will be evident to those skilled in the art. In addition, the user's preferences are derived from, for example, his personal or professional informational desires, organizational goals and objectives, analytical training and skills, interpretational biases, and experiences with identification of information. User preferences include informational and organizational objectives useful to organizing and increasing the knowledge base of the user. For example, in the case of the Singapore journalist mentioned above, preferences used in organizing the articles are based on the journalist's interpretation and experience on the relevancy of such topics to his readers and the volume of articles on such topics over time.

Units of information which share common attributes or content, as indicated by their information vectors, are said to be similar to each other. Units of information which share few or no common attributes or content are said to be dissimilar to each other. The system may automatically determine similarity between two units of information based on the application of a similarity function. Alternately, the user may determine the degree to which units of information appear to be similar to each other based on his or her knowledge and preferences.

The disclosed method can be executed using a computer system, such as a personal computer or the like, as is well known in the art. The disclosed system can be a stand-alone system, or it can be incorporated in a computer system, in which case the user interface can be the graphical or other user interface of the computer system and the cluster structure knowledge base can be, for example, a file in any of the computer system's storage areas, elements or devices.

Referring to FIG. 1, there is provided a user-configurable information clustering system 10 comprising an information clustering engine 20, a personalization module 50, a cluster structure knowledge base 14, and a user interface module 16. Information in the form of information and preference vectors is supplied to the clustering engine 20, which comprises a hybrid neural network model that performs a hybrid of supervised and unsupervised learning. The neural network may be conventional. For example, an ARTMAP system or an ARAM system, such as described in "Adaptive Resonance Associative Map", published in "Neural Networks", Vol. 8 No. 3, pp. 437-446 (1995), which is incorporated herein by reference, can be used. The user interface module 16 may comprise a graphical user interface, keyboard, keypad, mouse, voice command recognition system, or any combination thereof, and may permit graphical visualization of information groupings. The cluster structure knowledge base 14 may be any conventional recordable storage format, for example a file in a storage device, such as magnetic or optical storage media, or in a storage area of a computer system.

The user-configurable information clustering system 10 allows a user to personalize or influence the cluster structure by indicating his or her own preferences in the form of preference vectors. Through the user interface module 16 and the personalization module 50, the user is able to create a customized cluster structure by selective and/or repeated application of the following: creating a new cluster, labeling an existing cluster, and modifying cluster structure by merging and splitting clusters. In addition, the customized cluster structure can be stored in the cluster structure knowledge base 14 and retrieved at a later stage for processing new information.

Figure 2A:
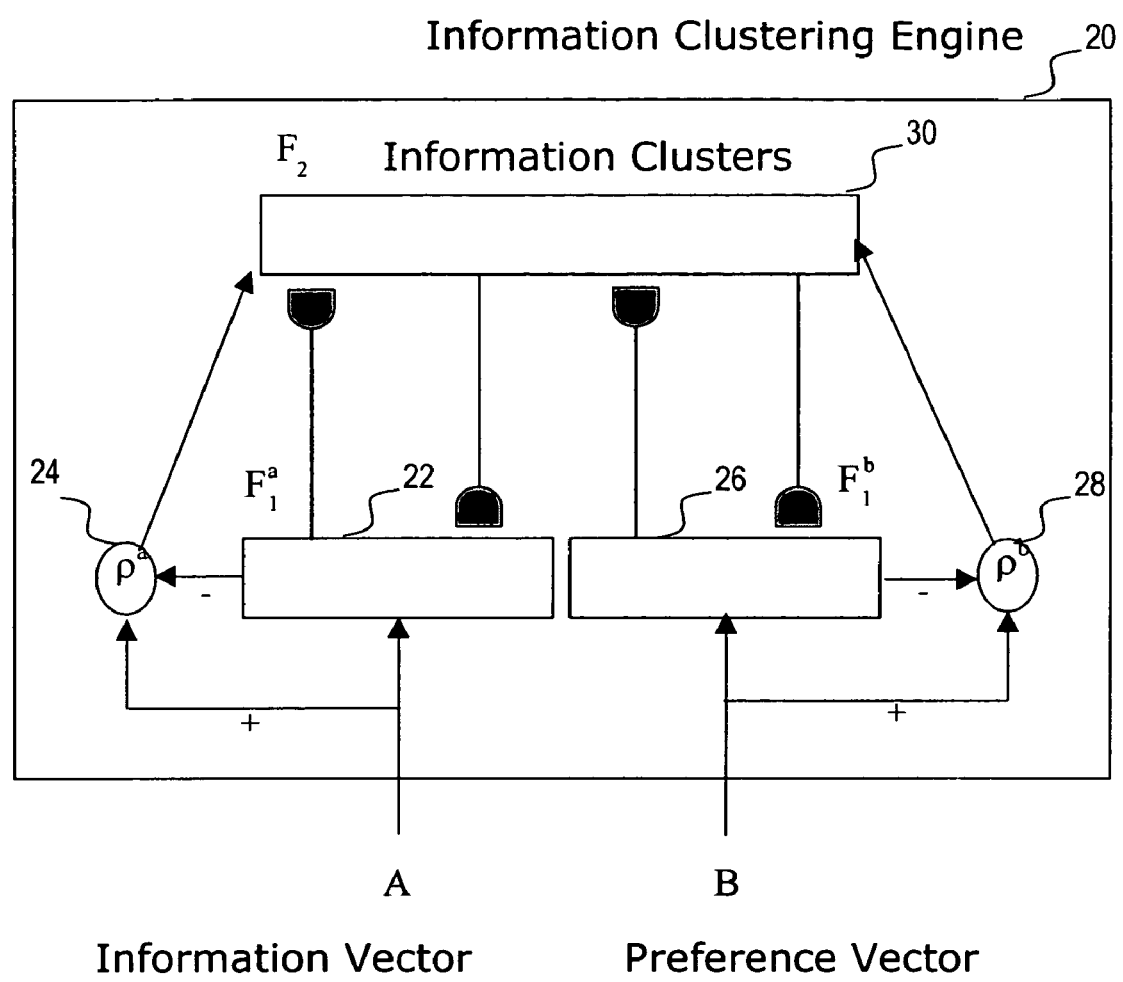
FIG. 2A shows an exemplary architecture for the information clustering engine of FIG. 1 for clustering information in response to user preferences. Information is encoded as information vectors. User preferences are encoded as preference vectors. The $F_1^a$ field serves as the input field for the information vectors. The $F_1^b$ field serves as the input field for the preference vectors. Information clusters (represented as $F_2$) are formed through the synchronized clustering of the information and preference vectors.

As described in the article cited above, ARAM is a family of neural network models that performs incremental supervised learning of recognition categories (pattern classes) and multidimensional maps of both binary and analog patterns. Referring to FIG. 2A, an ARAM system can be visualized as two overlapping Adaptive Resonance Theory (ART) modules consisting of two input fields $F_1^a$ 22 and $F_1^b$ 26 with a cluster field $F_2$ 30.

Each $F_2$ cluster node j is associated with an adaptive template information vector $w_j^a$ and corresponding adaptive template preference vector $w_j^b$. Initially, all cluster nodes are uncommitted and all weights are set equal to 1. After a cluster node is selected for encoding, it becomes committed.

Fuzzy ARAM dynamics are determined by the choice parameters $\alpha^a > 0$ and $\alpha^b > 0$; the learning rates $\beta^a$ in [0, 1] and $\beta^b$ in [0, 1]; the vigilance parameters $\rho^a$ 24 in [0, 1] and $\rho^b$ 28 in [0, 1]; and a contribution parameter $\gamma$ in [0, 1]. The choice parameters $\alpha^a$ and $\alpha^b$ control the bias towards choosing a $F_2$ cluster whose template information and preference vectors have a larger norm or magnitude. The learning rates $\beta^a$ and $\beta^b$ control how fast the template information and preference vectors $w_j^a$ and $w_j^b$ adapt to the input information and preference vectors A and B, respectively. The vigilance parameters $\rho^a$ and $\rho^b$ determine the criteria for a satisfactory match between the input and the template information and preference vectors, respectively. The contribution parameter $\gamma$ controls the weighting of contribution from the information and preference vectors when selecting an $F_2$ cluster.

Figure 2B:
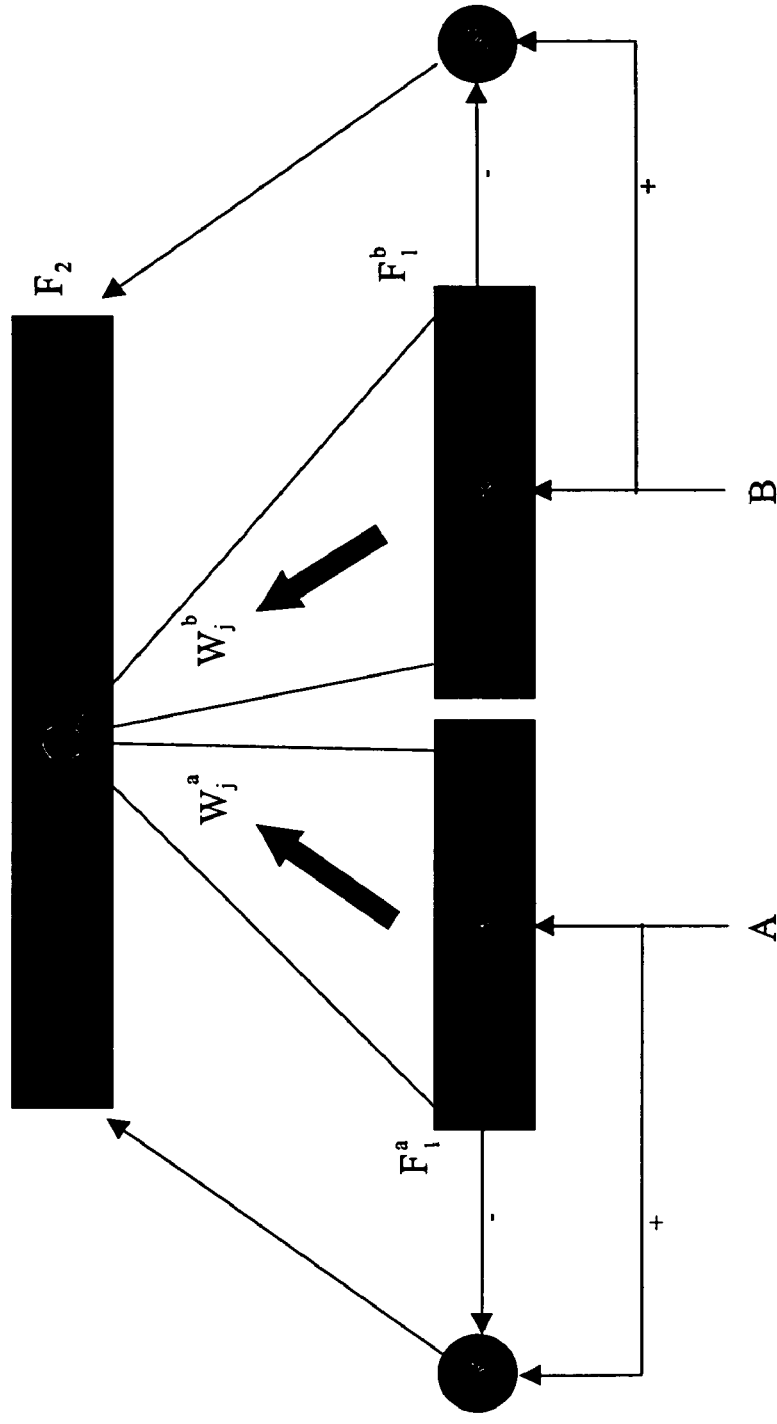
FIG. 2B illustrates the category choice process of the information clustering engine of FIG. 1.

Referring to FIG. 2B, given an information vector A with an associated preference vector B, the system first searches for an $F_2$ cluster J encoding a template information vector $w_J^a$ and a template preference vector $w_J^b$ paired therewith that are closest to the input information vector A and the input preference vector B, respectively, according to a similarity function. Specifically, for each $F_2$ cluster j, the information clustering engine calculates a similarity score based on the input information and preference vectors A and B, respectively, and the template information and preference vectors $w_j^a$ and $w_j^b$, respectively. An example of a similarity function is given below as the category choice function, eqn. (3). The $F_2$ cluster that has the maximal similarity score is then selected and indexed at J.

Figure 2C:
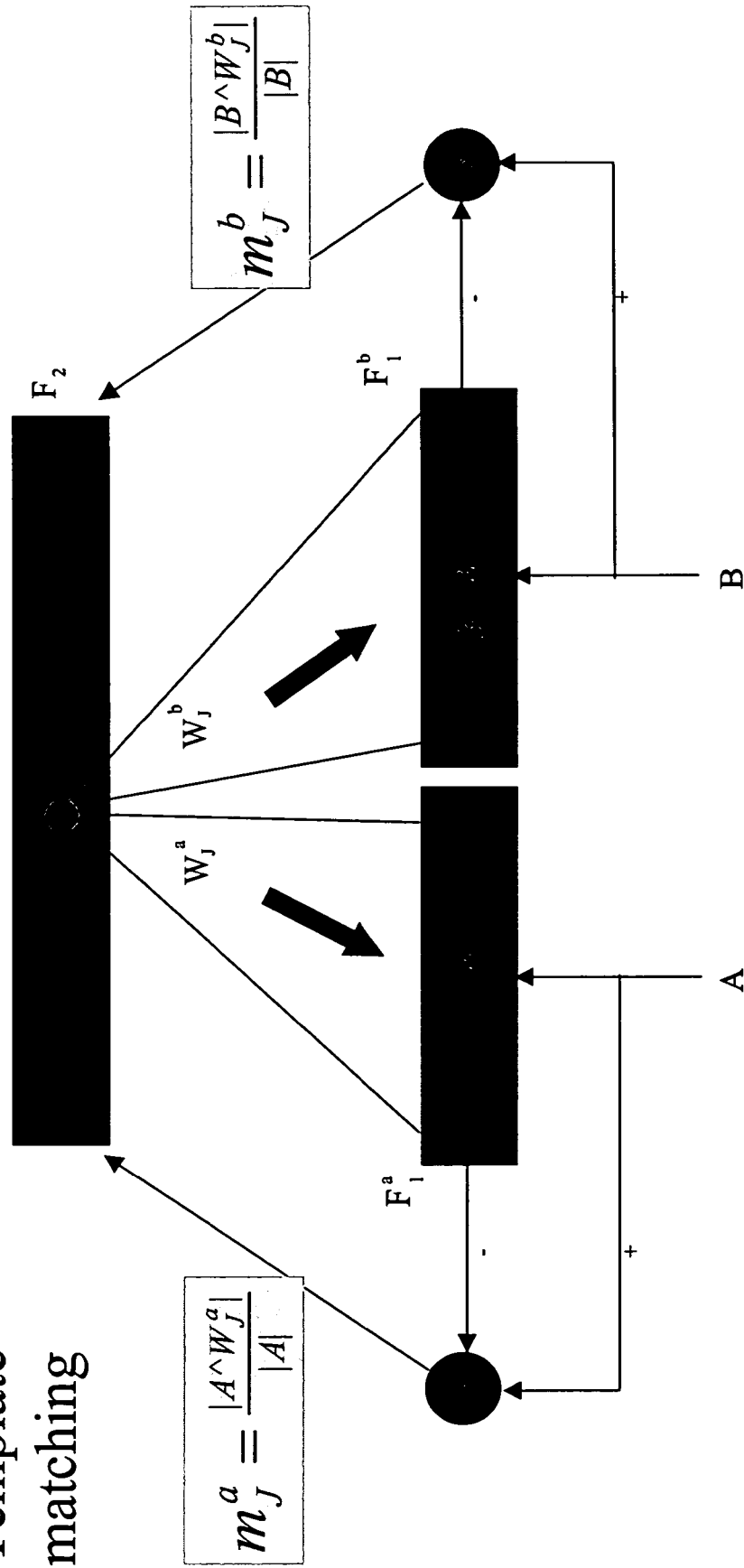
FIG. 2C illustrates the template matching and the template learning process of the information clustering engine of FIG. 1.

Referring to FIG. 2C, the information clustering engine performs template matching to verify that the template information vector $w_J^a$ and the template preference vector $w_J^b$ of the selected category J match well with the input information vector A and the input preference vector B, respectively, according to another similarity function, e.g. eqn. (4) below. If so, the system performs template learning to modify the template vectors $w_J^a$ and $w_J^b$ of the $F_2$ cluster J to encode the input information and preference vectors A and B, respectively. Otherwise, the cluster is reset and the system repeats the process until a match is found. The detailed algorithm is given below.

The ART modules used in ARAM may be of a type which categorizes binary patterns, analog patterns, or a combination of the two patterns (referred to as "fuzzy ART"), as is known in the art. Described below is a fuzzy ARAM model composed of two overlapping fuzzy ART modules.

Figure 3:
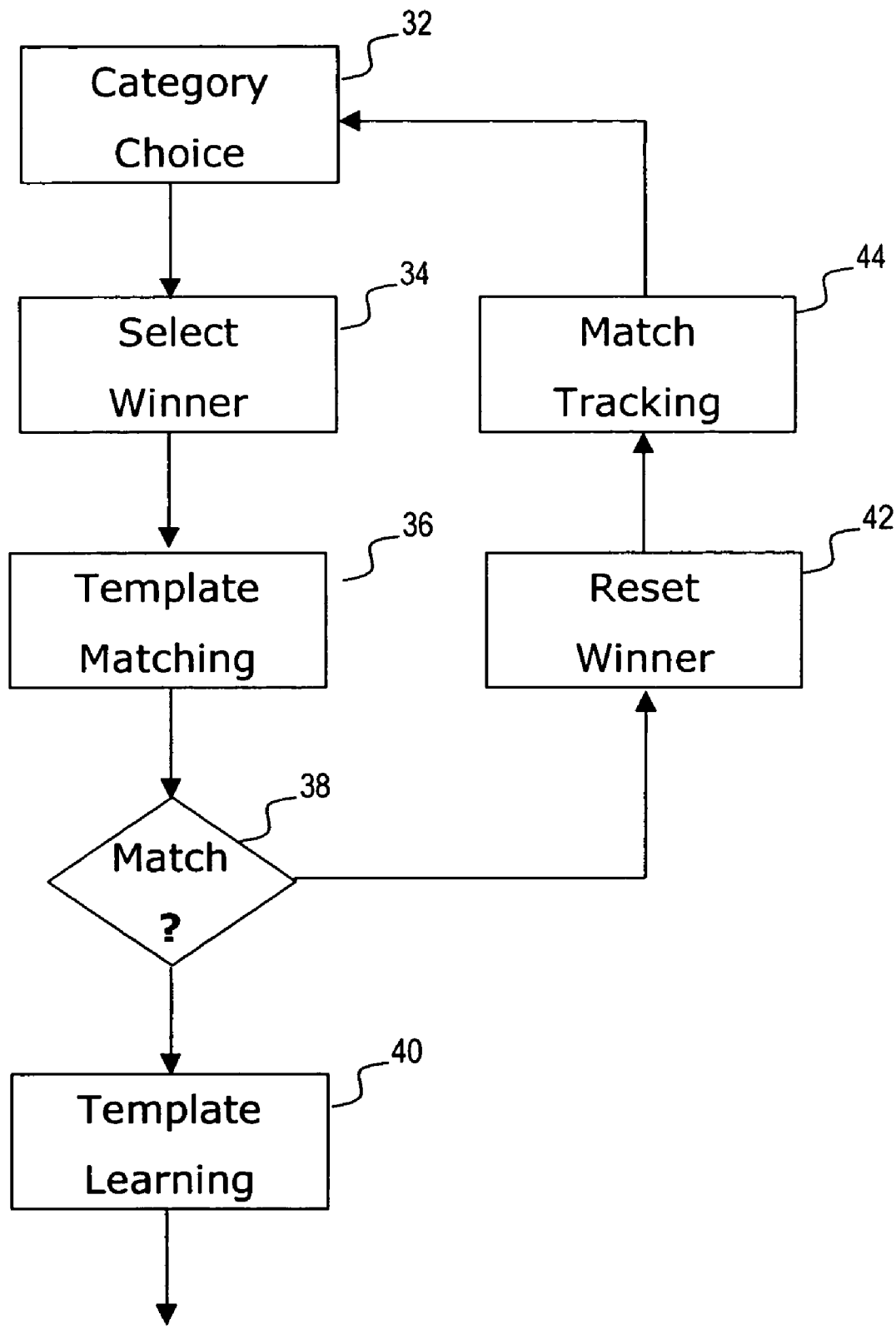
FIG. 3 illustrates an exemplary flow diagram for incorporating user preferences in the information clustering process.

Referring to FIG. 3, the dynamics of the information clustering engine 20 is described as follows. Given a pair of $F_1^a$ and $F_1^b$ input vectors A and B, for example, an information vector and preference vector, respectively, for each $F_2$ node j, a category choice process 32 computes the choice function $T_j$ as defined by $$T_j = \gamma |A \wedge w_j^a|/(\alpha^a + |w_j^a|) + (1-\gamma)|B \wedge w_j^b|/(\alpha^b + |w_j^b|) \tag{3}$$

where, for vectors p and q, the fuzzy AND operation is defined by $(p \wedge q)_i = \min(p_i, q_i)$, and the norm is defined by $|p| = \Sigma_i p_i$. The system is said to make a choice when at most one $F_2$ node can become active. The choice is indexed at J by a select winner process 34 where $T_J = \max \{T_j:$ for all $F_2$ nodes j$\}$.

A template matching process 36 then checks if the selected cluster represents a good match. Specifically, a check 38 is performed to verify if the match functions, $m_J^a$ and $m_J^b$, meet the vigilance criteria in their respective modules:

$$m_J^a = |A \wedge w_J^a|/|A| \geq \rho^a \text{ and } m_J^b = |B \wedge w_J^b| = |B \wedge w_J^b|/|B| \geq \rho^b. \tag{4}$$

Resonance occurs if both criteria are satisfied. Learning then ensues, as defined below. If any of the vigilance constraints is violated, mismatch reset 42 occurs in which the value of the choice function $T_J$ is set to 0 for the duration of the input presentation. The search process repeats, selecting a new index J until resonance is achieved.

Once the search ends, a template learning process 40 updates the template information and preference vectors $w_J^a$ and $w_J^b$, respectively, according to the equations $$w_j^{a(new)} = (1-\beta^a)w_j^{a(old)} + \beta^a(A \wedge w_j^{a(old)}) \quad (5)$$

and $$w_j^{b(new)} = (1-\beta^b)w_j^{b(old)} + \beta^b(B \wedge w_j^{b(old)}) \quad (6)$$

respectively. For efficient coding of noisy input sets, it is useful to set $\beta^a = \beta^b = 1$ when J is an uncommitted node, and then take $\beta^a < 1$ and $\beta^b < 1$ after the cluster node is committed. Fast learning corresponds to setting $\beta^a = \beta^b = 1$ for committed nodes.

At the start of each input presentation, the vigilance parameter $\rho_a$ equals a baseline vigilance $\underline{\rho}^a$. If a reset occurs in the category field $F_2$, a match tracking process 44 increases $\rho^a$ until it is slightly larger than the match function $m_j^a$. The search process then selects another $F_2$ node J under the revised vigilance criterion.

Figure 4:
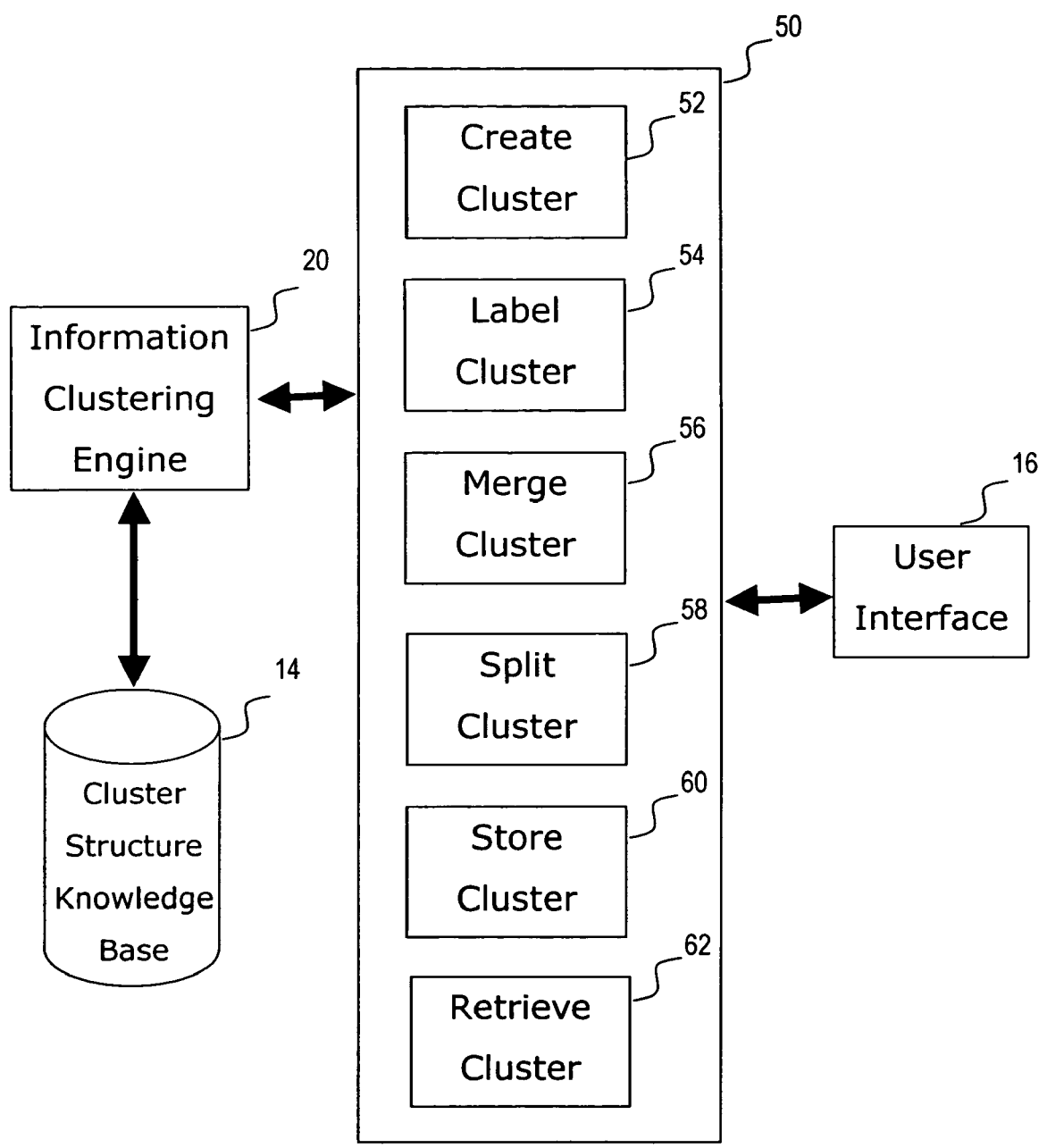
FIG. 4 illustrates an exemplary set of personalization functions that a user could use while performing information clustering.

Referring to FIG. 4, the personalization module 50 works in conjunction with the information clustering engine 20 to incorporate user preferences to modify the machine generated cluster structure.

An exemplary parameter setting for the information clustering engine 20 is as follows: $\alpha^a = \alpha^b = 0.1$, $\beta^a = \beta^b = 1$, $\underline{\rho}^a = 0.5$, $\rho^a = 1$, and $\gamma = 0.5$. During automatic clustering, no user preference is given, and the information clustering engine 20 automatically generates a cluster structure, referred to as a machine-generated cluster structure: For each unit of information ($\Phi$), a pair of vectors (A, $B_0$) is presented to the system, where A is the representation vector of $\Phi$ and $$B_{0i} = 1 \text{ for } i=1, \ldots, 2N. \quad (7)$$

Since $|B_0 \wedge w_j^b|/|B_0|$ equals 1, condition (6) reduces to $$m_j^a = A \wedge w_j^a |/|A| \geq \rho^a. \quad (8)$$

Essentially, the system now operates like a pure clustering system that self-organizes the information based on similarities in the information vectors. The coarseness of the information groupings is controlled by the baseline vigilance parameter ($\underline{\rho}^a$).

A create cluster module 52 allows the user to add a new information cluster into the system so that information can be organized according to such an information grouping. Through the user interface module 16, the user can input a pair of template information and preference vectors ($w_j^a$, $w_j^b$) which defines the key attributes of the information in the cluster together with a cluster label, if any. The resulting clusters reflect the user's preferred way of grouping information and can be used as the default slots for organizing information.

A label cluster module 54 allows the user to assign labels to "mark" certain information groupings that are of particular interest (to the user) so that new information can be organized according to such information groupings. Through the user interface module 16, the user can assign a label $L_k$ to a cluster j by modifying the template preference vector $w_j^b$ to equal $B_k$, where $B_k$ is a preference vector representing $L_k$. Labels reflect the user's interpretation of the groupings. They are useful landmarks to the user in navigating the information database and locating old as well as new information.

Using the label cluster module 54, the user is able to merge clusters implicitly by labeling them with the same labels. In this case, the merging is said to be a local one as it only affects the clusters that are labeled. To do a global merging, a merge cluster module 56 allows the user to combine two or more information groupings generated by the clustering process using a lower vigilance parameter value. Through the user interface module 16, the user can select one or more units of information in each of two different clusters as an indicative standard of similarity. As an example, $A_1$ and $A_2$ can be two information vectors representing two units of information. The revised baseline vigilance parameter $\underline{\rho}^a$ would then be computed as $$\underline{\rho}^a = \min(|A_1 \wedge A_2|/|A_1|, |A_1 \wedge A_2|/|A_2|). \quad (9)$$

Using the new baseline vigilance parameter, $A_1$ and $A_2$ will satisfy the match condition as stated in (4) and may be grouped into one cluster as a result of the relaxed similarity criteria. The effect of cluster merging is global, in the sense that the system now operates at a lower vigilance on the whole, grouping items together that it would otherwise distinguish.

A split cluster module 58 allows the user to split an information group into two or more clusters by indicating that certain units of information are sufficiently different to be grouped separately. Through the user interface module 16, the user can select two specific units of information, for example $A_1$ and $A_2$, in a cluster and assign to them two different labels, for example $L_1$ and $L_2$, represented by $B_1$ and $B_2$, respectively.

The updated pairs of information and preference vectors, ($A_1$, $B_1$) and ($A_2$, $B_2$), together with the rest of the vectors, are presented to the information clustering engine 20 for re-clustering. Since $B_1 \neq B_2$, and $\rho^b = 1$, $A_1$ and $A_2$ will be grouped into different clusters. In addition, the remaining information vectors, originally in a single cluster, will be re-organized into one of the two new clusters based on their similarities to $A_1$ and $A_2$.

In another example, $A_1$ and $A_2$ can be used to tighten the match condition for the entire information space. In this case, the baseline vigilance parameter $\underline{\rho}$ a would be recomputed as $$\underline{\rho}^a = \max(|A_1 \wedge A_2|/|A_1|, |A_1 \wedge A_2|/|A_2|) + \epsilon, \quad (12)$$

where $\epsilon$ is a small constant.

By selective and/or repeated application of the create cluster, label cluster, merge cluster and split cluster functions of the personalization module 50, the user is able to create a labeled cluster structure which incorporates his own preferences.

To preserve the labeled cluster structure for a fresh clustering session, a store cluster module 60 transfers the following information to the cluster structure knowledge base 14.

1. The baseline vigilance parameter ($\underline{\rho}^a$).
2. For each labeled cluster j, the template information vector $w_j^a$ and the associated template preference vector $w_j^b$.

The stored clusters and cluster structure can be retrieved at a later stage from the knowledge base 14 using a retrieve cluster module 62 to initialize the architecture of the information clustering engine 20, that is, the retrieved cluster structure is used as the initial structure of the information clustering engine. Based on the initialized cluster structure, new information can be organized according to the user's preferences stored over the previous sessions. The cluster structure may also be modified by further personalization.

An embodiment of the disclosed invention is personalized document navigation wherein the user is allowed to customize the document navigation space, i.e. the organized collection of information available to the user, with respect to his or her interpretation and preferences.

Another embodiment of the invention is a drag-and-draw approach to building a categorization system. Information is first automatically clustered into natural groupings based on similarities in content. By modifying the machine-generated groupings, the user can define her preferred groupings using the personalization functions as described herein. A classification system can be created in an intuitive and interactive manner without the need for example annotation (i.e., labeling information) or knowledge specification (e.g., written classification rules).

Yet another embodiment is detection of new information and trend analysis. The user defines his know-how and interpretation of the environment in terms of how he wants the information to be organized. New information is supplied periodically to the information clustering system. New information that falls within the user-defined cluster structure corresponds to familiar themes of information. Any new information that falls outside of the defined cluster structure represents new themes which are potentially interesting to the user. Repeated personalization of the information in the information database, i.e. creating, labeling, merging, splitting, and storing clusters and the resulting labeled cluster structure, helps the user to identify information that is new with respect to his experience and to analyze unexpected trends.

Various preferred embodiments of the invention have now been described. While these embodiments have been set forth by way of example, various other embodiments and modifications will be apparent to those skilled in the art. Accordingly, it should be understood that the invention is not limited to such embodiments, but encompasses all that which is described in the following claims.

What is claimed is:

1. A method of organizing information into a plurality of clusters with a user-configurable information clustering system, the method using a processor executing instructions stored in a memory, the method comprising:
   a) grouping units of information into clusters based on similarities to create a cluster structure; and
   b) modifying said cluster structure by a user according to user knowledge and preferences, wherein
   said units of information are grouped into clusters based on a similarity function, and
   said clusters have a coarseness which is controlled by a baseline vigilance parameter.

2. The method according to claim 1 wherein said grouping units of information into clusters is carried out automatically to create a machine-generated cluster structure.

3. The method according to claim 1 wherein said modifying comprises creating at least one new information cluster defined by the user.

4. The method according to claim 3 wherein said modifying further comprises labeling each information cluster by the user using a user-defined symbol.

5. The method according to claim 4 wherein said modifying further comprises merging of at least two clusters chosen by the user.

6. The method according to claim 5 wherein said modifying further comprises splitting at least one cluster chosen by the user.

7. The method according to claim 6 wherein said modifying further comprises storing said cluster structure in a knowledge base.

8. The method according to claim 1 wherein said modifying comprises labeling at least one information cluster by the user using a user-defined symbol.

9. The method according to claim 1 wherein said modifying comprises merging of at least two information clusters chosen by the user.

10. The method according to claim 1 wherein said modifying comprises splitting of at least one information cluster chosen by the user.

11. The method according to claim 1 wherein said modifying comprises storing said cluster structure in a knowledge base.

12. The method according to claim 1 wherein said information comprises text, image, audio, video or any combination thereof.

13. The method according to claim 1 wherein said user-configurable information clustering system incorporates user knowledge and preferences for information clustering.

14. The method according to claim 1 wherein said user-configurable information clustering system further comprises a user interface to provide for viewing and manipulating said cluster structure.

15. The method according to claim 1 wherein each of said units of information is represented by an information vector.

16. The method according to claim 1 wherein a user-preferred information grouping is represented by a preference vector.

17. The method according to claim 1 further comprising retrieving said cluster structure to initialize said user-configurable information clustering system prior to clustering new information.

18. A method of organizing information into a plurality of clusters with a user-configurable information clustering system, the method using a processor executing instructions stored in a memory, the method comprising:
   grouping units of information into clusters based on similarities to create a cluster structure;
   modifying said cluster structure by a user according to user knowledge and preferences; and
   indicating, by a user, a preference for a lower baseline vigilance parameter by selecting at least one unit of information from each of at least two clusters wherein the selected units of information are deemed by the user to be similar to each other.

19. A method of organizing information into a plurality of clusters with a user-configurable information clustering system, the method using a processor executing instructions stored in a memory, the method comprising:
   grouping units of information into clusters based on similarities to create a cluster structure;
   modifying said cluster structure by a user according to user knowledge and preferences; and
   indicating, by a user, a preference for a higher baseline vigilance parameter by selecting at least two units of information in a cluster, wherein said units of information are deemed by the user to be dissimilar to each other.

20. A user-configurable information clustering system using a processor executing instructions stored in a memory, the system comprising:
   a) an information clustering engine for clustering units of information based on similarities to create a cluster structure;
   b) a personalization module for modifying said cluster structure by a user according to user knowledge and preferences;
   c) a user interface to provide for viewing and manipulating said cluster structure; and
   d) a knowledge base for storing said cluster structure, wherein
   said units of information are grouped into clusters based on a similarity function, and said clusters have a coarseness which is controlled by a baseline vigilance parameter.

21. The system according to claim 20 wherein said information clustering engine automatically clusters information to create a machine-generated cluster structure.

22. The system according to claim 20 wherein said personalization module comprises
means for creating at least one new information cluster defined by the user.

23. The system according to claim 22 wherein said personalization module further comprises means for labeling at least one information cluster by the user using a user-defined symbol.

24. The system according to claim 23 wherein said personalization module further comprises means for merging at least two information clusters chosen by the user.

25. The system according to claim 24 wherein said personalization module further comprises means for splitting at least one information cluster chosen by the user.

26. The system according to claim 25 wherein said personalization module further comprises means for storing the cluster structure in said knowledge base.

27. The system according to claim 26 wherein said personalization module further comprises means for retrieving the cluster structure from said knowledge base.

28. The system according to claim 20 wherein said personalization module comprises means for labeling at least one information cluster by the user using a user-defined symbol.

29. The system according to claim 20 wherein said personalization module comprises means for merging at least two information clusters chosen by the user.

30. The system according to claim 20 wherein said personalization module comprises means for splitting at least one information cluster chosen by the user.

31. The system according to claim 20 wherein said personalization module comprises means for storing the cluster structure in said knowledge base.

32. The system according to claim 20 wherein said personalization module comprises means for retrieving the cluster structure from said knowledge base.

33. The system according to claim 20 wherein said information comprises text, image, audio, video or any combination thereof.

34. The system according to claim 20 wherein user knowledge and preferences are incorporated in information clustering.

35. The system according to claim 20 wherein said user interface permits graphical visualization of said information clusters to provide for viewing and manipulating said cluster structure.

36. The system according to claim 20 wherein each of said units of information is represented by an information vector.

37. The system according to claim 20 wherein a user-preferred information grouping is represented by a preference vector.

38. A user-configurable information clustering system using a processor executing instructions stored in a memory, the system comprising:

a) an information clustering engine for clustering units of information based on similarities to create a cluster structure;

b) a personalization module for modifying said cluster structure by a user according to user knowledge and preferences;

c) a user interface to provide for viewing and manipulating said cluster structure; and d) a knowledge base for storing said cluster structure, wherein said personalization module permits indication by a user of a preference for a lower baseline vigilance parameter by selecting at least one unit of information from each of at least two clusters wherein said selected units of information are deemed by the user to be similar to each other.

39. A user-configurable information clustering system using a processor executing instructions stored in a memory, the system comprising:

a) an information clustering engine for clustering units of information based on similarities to create a cluster structure;

b) a personalization module for modifying said cluster structure by a user according to user knowledge and preferences;

c) a user interface to provide for viewing and manipulating said cluster structure; and d) a knowledge base for storing said cluster structure, wherein said personalization module permits indication by a user of a preference for a higher baseline vigilance parameter by selecting at least two units of information in a cluster, wherein said units of information are deemed by the user to be dissimilar to each other.

* * * * *